United States Patent Office 3,567,605
Patented Mar. 2, 1971

3,567,605
PHOTOCHEMICAL PROCESS
Ralph S. Becker, 518 Knipp,
Houston, Tex. 77024
No Drawing. Filed Mar. 30, 1966, Ser. No. 542,429
Int. Cl. B01j 1/10, 1/12
U.S. Cl. 204—158                                    7 Claims

ABSTRACT OF THE DISCLOSURE

A photochemical system employing chromene or its derivatives having the general formula:

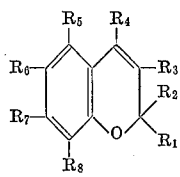

where any of $R_1$ through $R_8$ are hydrogen or where one or more hydrogens are replaced by substitution with an alkyl, aryl, alkoxy, hydroxy or amino radical or are replaced by condensation across any one or more of the positions $R_3$–$R_4$; $R_5$–$R_6$; $R_6$–$R_7$; and $R_7$–$R_8$.

---

This invention relates to photochemical systems and is particularly concerned with photochemical systems employing a process in which the color of a compound is changed by irradiation. This color change process is commonly referred to as either "phototropic" or "photochromic."

Prior to the present invention a variety of compounds having photochromic properties were known and used. Such compounds include for example, heteropolytungstic acids, mercuric organic complexes, spiropyrans, certain ketone naphthalenes, certain anthrones, aci-aromatic nitromethane compounds and certain fulgides and hydrazones.

Typically, such photochemical processes are utilized in producing record matrices, in energy storage systems, in photon counting systems and in light attenuation systems, among others.

In accordance with the present invention, chromene, or a chromene derivative, is used to provide the photochromic element and the system is so arranged that the chromene, or chromene derivative, may be selectively subjected to high energy irradiation, e.g., ultraviolet and visible light, beta and alpha rays, to alter the color of the system.

To illustrate:

It has been found that the parent composition, chromene, which has the general structural formula:

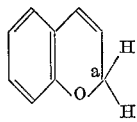

has two color states, a colorless state in which the carbon-to-oxygen bond (i.e., bond $a$) is intact and a yellow-orange state in which this bond is broken. These color states prevail even when the compound is in solution. This parent compound may be converted from its colorless state to its yellow-orange state by irradiation with ultraviolet light, in methanol solution at a temperature of from about —30° C. to —40° C. Reversal to the colorless state will occur when the temperature of the compound is elevated to about 0° C. or higher.

Different colors, different shades of color and different conditions for color production and erasure obtain when using chromene derivatives and when the concentration of chromene or chromene derivative is varied.

Thus, when a photochemically colored product is to be produced from chromene or a chromene derivative this will normally be accomplished by irradiation in the ultraviolet absorption bands of the reactant, (e.g., chromene). Some chromene derivatives, however, will have part of their absorption in the visible region and can, therefore, be converted to a photochemically colored product by irradiation with visible light, e.g., the chromene derivative of Example (j) below.

Conversely, erasure may be achieved by irradiation in the visible absorption bands of the photochemically produced colored product, or, frequently, by temperature elevation.

For example:

(a) The chromene derivative having the formula:

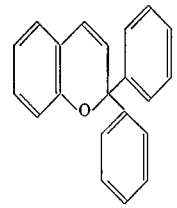

will, with ultraviolet irradiation below about —40° C. change from colorless to wine red. Irradiation in the visible absorption bands reverses the product from wine red to colorless.

(b) The chromene derivative having the formula:

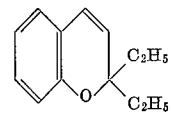

is normally colorless but quickly changes to blood red when subjected to ultraviolet irradiation at temperatures from about —40° C. to —196° C. Reversal to colorless occurs when temperature is elevated to about —10° C. In dilute solution, however, this derivative becomes orange to yellow when irradiated.

(c) The chromene derivative having the formula:

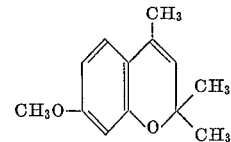

is normally colorless but quickly changes to yellow when subjected to ultraviolet irradiation at temperatures from about —40° C. to —196° C. Reversal to colorless occurs when temperature is elevated above this range.

(d) The chromene derivative having the formula:

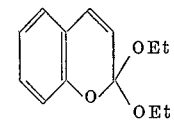

is normally colorless but changes to pink-purple when subjected to ultraviolet irradiation at temperatures from about —40° C. to —196° C. Reversal to colorless occurs when temperature is elevated above this range.

(e) The chromene derivative having the formula:

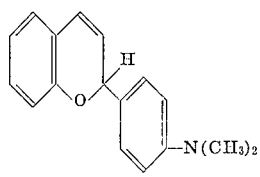

is normally colorless but changes to blue-green when subjected to ultraviolet irradiation at temperatures from about −40° C. to −196° C. Reversal to colorless occurs when temperature is elevated above this range.

(f) The chromene derivative having the formula:

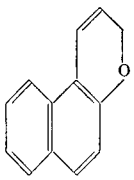

changes from colorless to yellow with ultraviolet irradiation below −40° C. and reverses to colorless at temperatures above about 35° C.

(g) The chromene derivative having the formula:

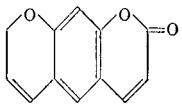

changes from colorless to purple with ultraviolet irradiation below −40° C. and reverses to colorless at elevated temperatures.

(h) The chromene derivative having the formula:

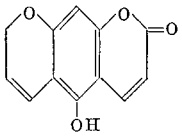

changes from colorless to violet with ultraviolet irradiation below about −40° C. and reverses to colorless at elevated temperatures.

(i) The chromene derivative having the formula:

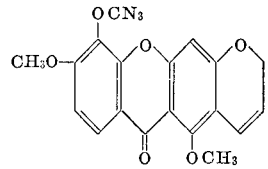

changes from colorless to green with ultraviolet irradiation below about −40° C. and reverses to colorless at elevated temperatures.

(j) The chromene derivative having the formula:

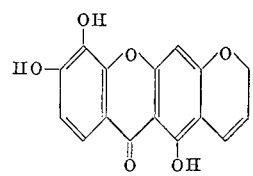

changes from yellow to green-brown with ultraviolet irradiation below about −40° C., remains colored at room temperatures and reverses to colorless at temperatures elevated above room temperatures.

(k) The chromene derivative having the formula:

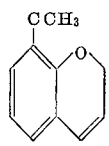

changes from colorless to wine red with low temperature ultraviolet irradiation, turns orange at room temperature and reverses to colorless at temperatures above about 30° C.

Still other derivatives will reversibly convert from colorless to colored state at room temperature.

For example:

(l) The chromene derivative having the formula:

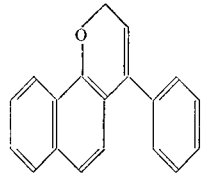

will (when dissolved in methanol or in a 10% benzene 90% methanol mixture, or in a 10% ethanol 90% glycerine mixture) convert from colorless to yellow-orange with ultraviolet irradiation (approximately 2000–4000 A.) at temperatures as low as −196° C. and as high as 30° C. and will remain stable at ambient temperatures for several hours.

(m) The chromene derivative having the formula:

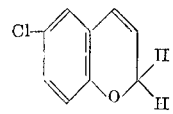

is normally colorless but quickly changes to yellow when subjected to ultraviolet irradiation at temperatures from about −40° C. to −196° C. Reversal to colorless occurs when temperature is elevated above this range.

(n) The chromene derivative having the formula:

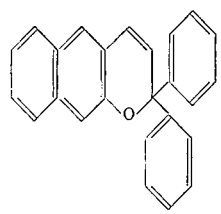

changes from colorless to yellow with ultraviolet irradiation below about −40° C. and reverts to colorless at room temperature.

(o) The chromene derivative having the formula:

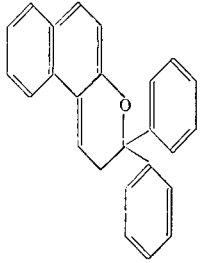

changes from colorless to orange with ultraviolet irradiation below about −40° C. then bleaches to colorless at room temperature.

(p) The chromene composition.

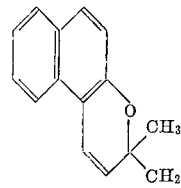

changes from colorless to yellow with ultraviolet irradiation at room temperature and reverses to colorless above 35° C.

In studies conducted with various embodiments of this invention several significant advantages over prior such systems have been observed. Notable among these are:

(a) Superior fatiguing characteristics, i.e., the number of times a given system may be cycled is significantly increased.

(b) A wider range of colors and shades is available.

(c) Operation over a wider range of temperatures and wavelengths is possible.

(d) Improved photochemical quantum yield, even in solid media.

(e) Improved solubility.

Thus, the phototropic compositions contemplated by this invention include chromene, the general formula for which may be represented as:

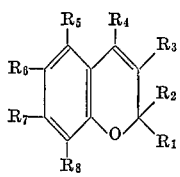

where $R_1$ through $R_8$ are hydrogen and its substituted and/or condensed derivatives where $R_1$ through $R_8$ may be alkyl, or aryl substituents or the molecule is condensed across at least one of the positions $R_3-R_4$, $R_5-R_6$, $R_6-R_7$ and $R_7-R_8$. In short, this invention contemplates use of chromene or one of its derivatives as the photochromic member of a photochemical system.

The color change and the conditions under which change will occur normally vary with the nature of the chromene or its concentration in the system (even with solvents ranging from liquid through solid state). Stability of the photochemically colored product and conditions for erasure vary with the same factors.

For light attenuation systems, image storage systems and dodging or gating systems it is preferable that the chromenes be dissolved in a plastic or solid medium. In energy storage systems a medium characterized by a notable change in viscosity as a function of temperature is preferred.

From the foregoing it will be seen that photochemical processes employing the present invention are afforded significant advantages over prior such processes. While several examples of certain embodiments of the invention have been given to facilitate an understanding of the invention by those skilled in the art the invention is not limited to these embodiments. To determine the scope of the invention reference must be made to the appended claims.

What is claimed is:

1. The photochemical process comprising the step of irradiating with ultraviolet, a chromene composition comprising a compound having the general formula

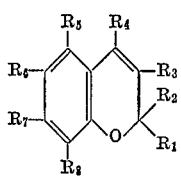

where $R_1$ through $R_8$ are hydrogen or where one or more hydrogens are replaced by substitution with an alkyl, aryl, alkoxy, hydroxy, or amino radical or are replaced by condensation across any one or more of the positions $R_3-R_4$; $R_5-R_6$; $R_6-R_7$; and $R_7-R_8$.

2. The photochemical process comprising the steps of dissolving a chromene compound having the general formula

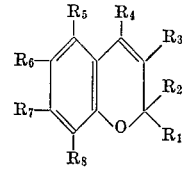

where $R_1$ through $R_8$ are hydrogen or where one or more hydrogens are replaced by substitution with an alkyl, aryl, alkoxy, hydroxy or amino radical or are replaced by condensation across any one or more of the positions $R_3-R_4$; $R_5-R_6$; $R_6-R_7$; and $R_7-R_8$ in a selected solvent; and, irradiating said dissolved chromene compound with ultraviolet to break the carbon, containing $R_1$ and $R_2$, oxygen bond and alter the color of said composition.

3. The process of claim 2 wherein said chromene compound comprises a substitution product having the general formula

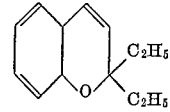

4. The process of claim 2 wherein said chromene compound comprises a substitution product having the general formula

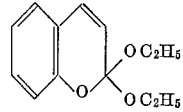

5. The process of claim 2 wherein said chromene compound comprises a substitution product having the general formula

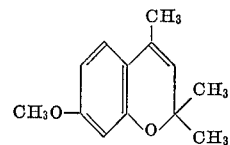

6. The process of claim 2 wherein said chromene compound comprises a substitution product having the general formula

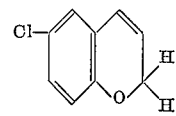

7. The process of claim 2 wherein said chromene compound has the general formula

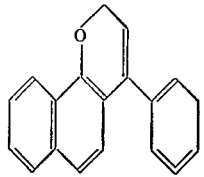

References Cited

UNITED STATES PATENTS

| | | | |
|---|---|---|---|
| 3,004,040 | 10/1961 | Pendse et al. | 260—345.5 |
| 3,122,563 | 2/1964 | Kaiser et al. | 260—345.2 |
| 3,154,565 | 10/1964 | Linn et al. | 260—345.2 |
| 3,314,975 | 4/1967 | Jurd | 260—345.2 |
| 2,700,736 | 1/1955 | Roberts | 250—83 |
| 3,073,955 | 1/1963 | Hale | 250—83 |
| 3,331,854 | 7/1967 | Huffman et al. | 204—158X |

HOWARD S. WILLIAMS, Primary Examiner

U.S. Cl. X.R.

250—83

U. S. PATENT OFFICE

UNITED STATES PATENT OFFICE
CERTIFICATE OF CORRECTION

Patent No. 3,567,605                     Dated March 2, 1971

It is certified that error appears in the above-identified patent and that said Letters Patent are hereby corrected as shown below:

Column 3, formula (i), that portion of the formula reading $\overset{O}{\underset{|}{C}}N_3$      should read      $\overset{O}{\underset{|}{C}}CH_3$ Column 3, formula (k), that portion of the formula reading $\overset{C}{\underset{|}{C}}CH_3$      should read      $\overset{O}{\underset{|}{C}}CH_3$ Signed and sealed this 15th day of June 1971.

(SEAL)
Attest:

EDWARD M. FLETCHER, JR.           WILLIAM E. SCHUYLER, JR.
Attesting Officer                     Commissioner of Patents